United States Patent
Krieg

(10) Patent No.: US 11,377,307 B2
(45) Date of Patent: Jul. 5, 2022

(54) CONTAINER-HANDLING APPARATUS

(71) Applicant: KHS GmbH, Dortmund (DE)

(72) Inventor: Andreas Krieg, Dittelsheim-Hessloch (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 17/281,657

(22) PCT Filed: Sep. 12, 2019

(86) PCT No.: PCT/EP2019/074363
§ 371 (c)(1),
(2) Date: Mar. 31, 2021

(87) PCT Pub. No.: WO2020/088827
PCT Pub. Date: May 7, 2020

(65) Prior Publication Data
US 2021/0387815 A1    Dec. 16, 2021

(30) Foreign Application Priority Data

Oct. 30, 2018   (DE) .................. 10 2018 127 120

(51) Int. Cl.
*B65G 47/84* (2006.01)
*B65G 37/00* (2006.01)
*B65G 47/51* (2006.01)

(52) U.S. Cl.
CPC .......... *B65G 47/846* (2013.01); *B65G 37/00* (2013.01); *B65G 47/5136* (2013.01); *B65G 2201/0244* (2013.01)

(58) Field of Classification Search
CPC .. B65G 47/846; B65G 37/00; B65G 47/5118; B65G 47/5127; B65G 47/5131; B65G 47/5136; B65G 1/00; B65G 1/02; B65G 1/04; B65G 2201/0244
USPC .................................. 198/347.1, 812, 463.2
See application file for complete search history.

(56) References Cited

U.S. PATENT DOCUMENTS

| | | | | |
|---|---|---|---|---|
| 2,932,376 A | * | 4/1960 | Millington | ............ B65G 37/02 198/341.03 |
| 7,731,022 B2 | * | 6/2010 | Zepf | ................... B65G 47/846 198/860.1 |
| 8,978,552 B2 | | 3/2015 | Preckel et al. | |
| 9,272,847 B2 | * | 3/2016 | Varhaniovsky | ........ B41J 3/4073 |
| 10,246,268 B2 | * | 4/2019 | Beisel | .................. B65G 47/846 |
| 2010/0044185 A1 | * | 2/2010 | Hahn | ................. B65G 47/5113 198/459.2 |
| 2011/0259713 A1 | | 10/2011 | Glass et al. | |
| 2013/0037377 A1 | * | 2/2013 | Drenguis | ........... B65G 47/5154 198/347.1 |
| 2013/0146241 A1 | * | 6/2013 | Hong | ...................... C08L 33/20 162/164.6 |

(Continued)

FOREIGN PATENT DOCUMENTS

| | | |
|---|---|---|
| DE | 102010018216 A1 | 10/2011 |
| DE | 102011010955 A1 | 8/2012 |
| WO | 2017/097537 A1 | 6/2017 |

*Primary Examiner* — James R Bidwell
(74) *Attorney, Agent, or Firm* — Occhiuti & Rohlicek LLP

(57) ABSTRACT

A transporter has stars arranged in series such that a container is transferred at a transfer point that is common to two successive stars. Some of the stars rotate about a fixed axis whereas other stars rotate about an axis that moves relative to the fixed axis.

12 Claims, 8 Drawing Sheets

(56) References Cited

U.S. PATENT DOCUMENTS

2018/0290837 A1 10/2018 Slurink

* cited by examiner

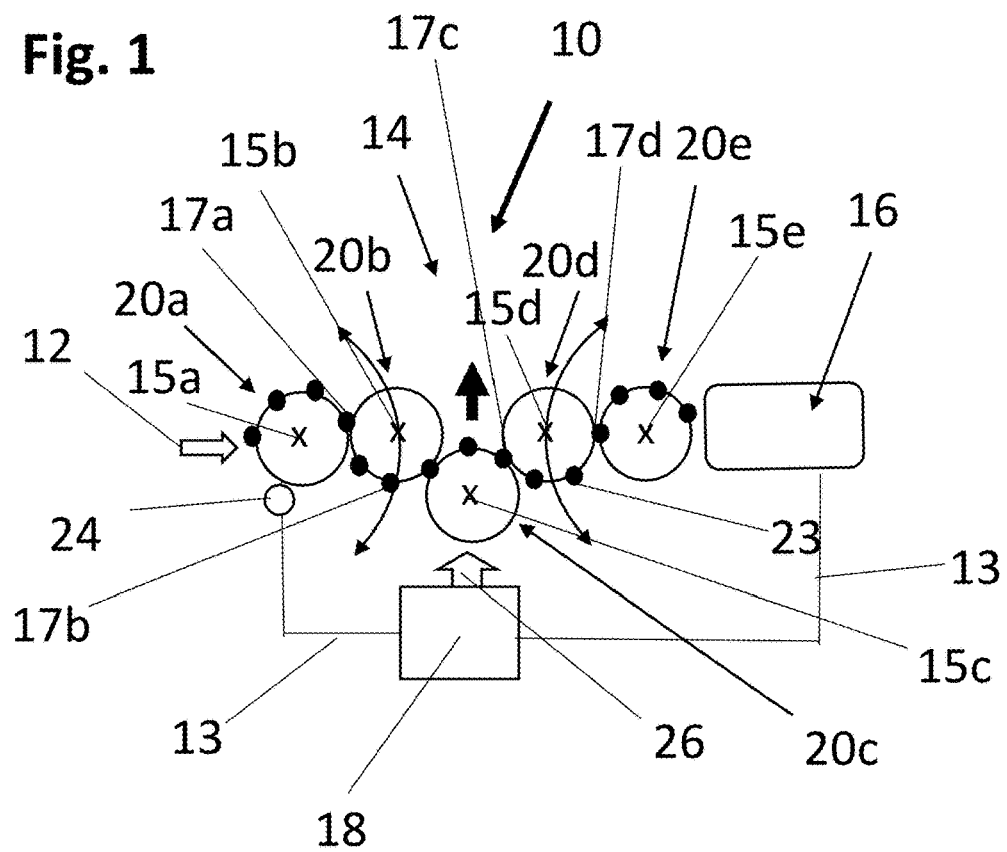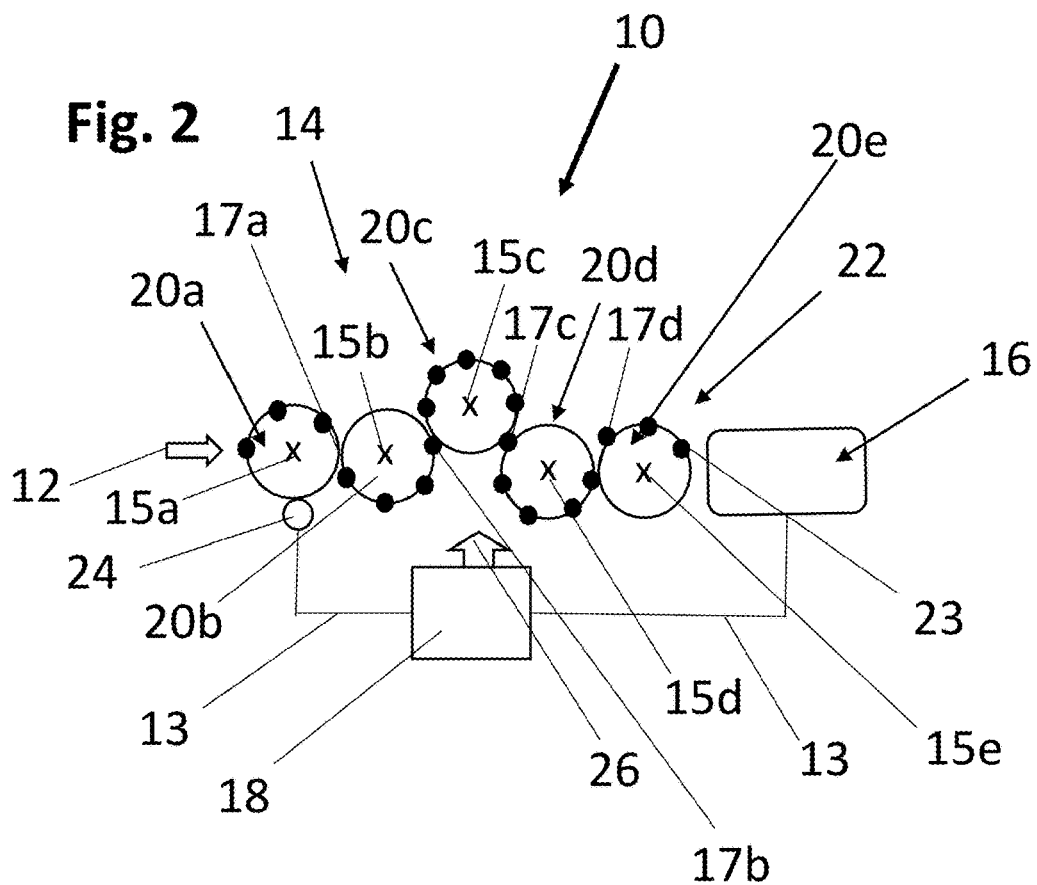

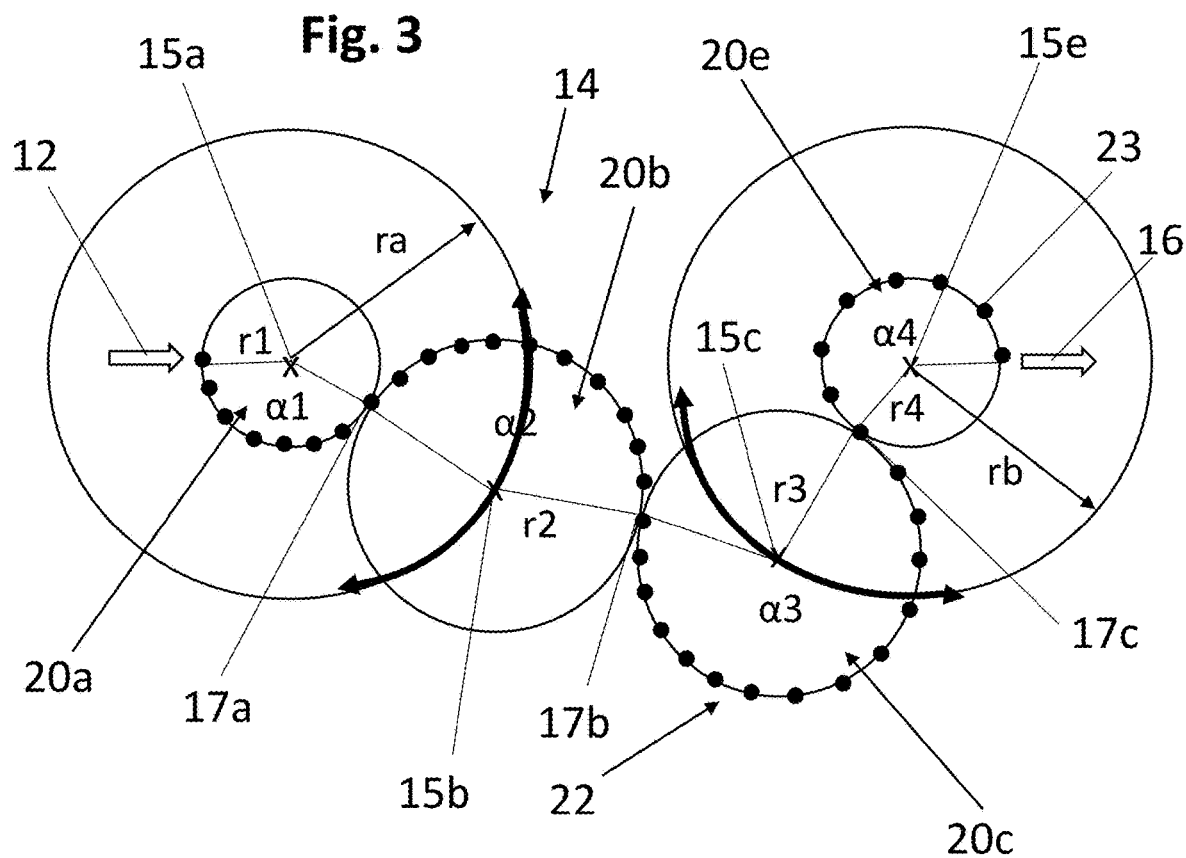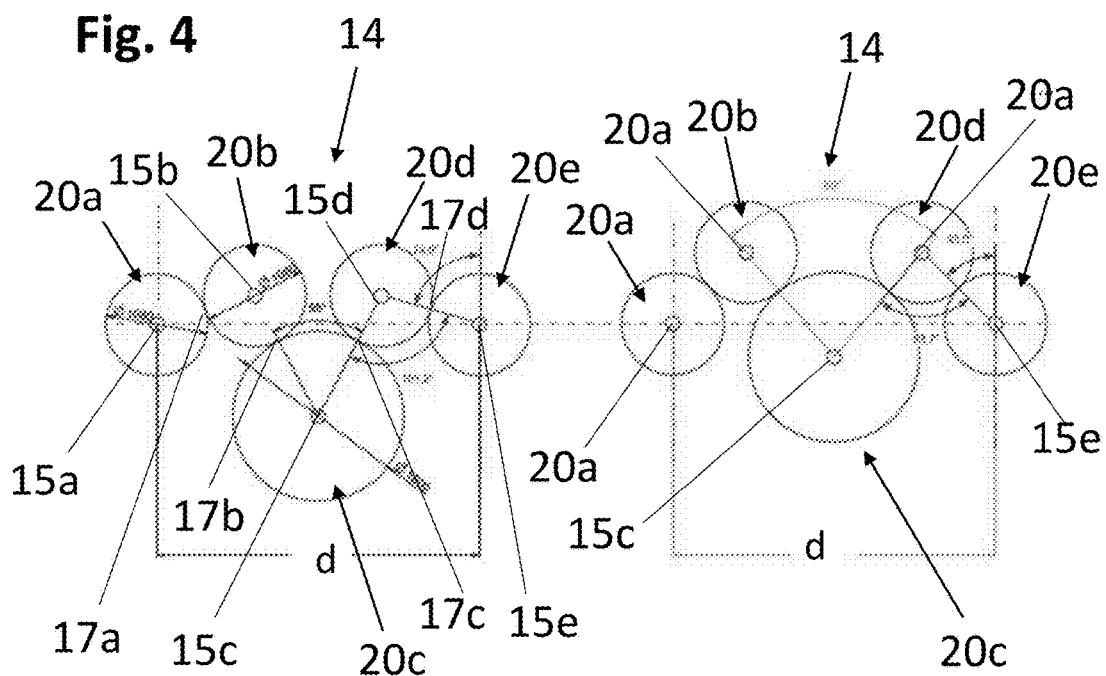

CONTAINER-HANDLING APPARATUS

RELATED APPLICATIONS

This is the national stage of international application PCT/EP2019/074363, filed on Sep. 12, 2019, which claims the benefit of the Oct. 30, 2018 priority date of German application DE102018127120.4, the contents of which are herein incorporated by reference.

FIELD OF INVENTION

The invention relates to container-handling machines, and in particular, to container-handling machines in which containers briefly enter and leave at different rates.

BACKGROUND

In a container-handling machine, it is possible for a mismatch to occur between the rate at which containers enter and the rate at which they leave. To accommodate this mismatch in the short term, it is useful to provide a buffer.

One way to implement the buffer is to provide paths of different lengths. One can then select an appropriate length based on the extent of the mismatch between the rates of container entry and exit.

A difficulty with this approach is that the path lengths are inherently digitized whereas the variation in container throughput is a continuous variable. This makes it difficult to precisely match the delay with the relevant variation.

SUMMARY

The present invention relates to a container-handling apparatus. The container-handling apparatus contains a container-handling machine, which can be, for example, a container-producing machine, such as, for example, a blow-molding machine, a labelling machine, a cleaning machine, a filling or packing machine, or the like. The container-handling apparatus further comprises at least one transporting apparatus which is arranged at least upstream of a container-handling machine, with at least two stars arranged one behind another, with container holders arranged equidistantly at their circumference, which are designed such as to grip containers, in particular in their neck region, and convey them to the container-handling machine. The stars arranged one behind another transfer the containers, preferably bottles, to one another in each case at a transfer point.

According to the invention, with the container-handling apparatus a plurality of stars are arranged behind one another, such that the containers run directly from one upstream star to a downstream star, wherein the transfer between the stars takes place at a transfer point. According to the invention, the position of the rotor axes of at least two stars following one another in the horizontal plane in the direction of transport can be moved between stars arranged upstream and downstream. As a result of the movement of the stars, the transfer point of the containers is varied. As a result of this, a sector or angle region of the circumference can be adjusted on which the bottles run on the star, i.e. the size of the circumferential stretch can be adjusted. In other words, the wrap angle through the transport stretch onto the star is changed. If the axes-of-rotation of the stars, arranged such as to be movable, are now displaced or rotated in such a way that the circumferential stretches on the moved stars and on stars which may be adjacent to them in total become greater, this will cause the transport stretch to be lengthened, and therefore an additional buffer zone formed, which, in the event of brief asynchronous operation in the container throughput, can for a short time accommodate additional containers at different points of the container-handling apparatus. Conversely, by means of a movement of the movably arranged stars, it is possible for the total of the circumferential stretches to be reduced, and the buffer zone made smaller. This is the case, for example, if the throughput of a container-handling machine behind the transporting apparatus increases again.

Preferably, the axes-of-rotation of the movable stars which are arranged adjacent to the fixed-position stars can be rotated about the axis-of-rotation of the corresponding adjacent fixed-position star. In this way, at the rotation of the position of the axis-of-rotation of the movably arranged stars, the transfer point between the fixed-position stars and the movably arranged stars can be maintained.

Preferably, the transporting apparatus has a group of at least three stars which are mounted such as to be movable, of which the axes-of-rotation of the outer two can be rotated, and the axis-of-rotation of the middle movable star is movable linearly. In this way, on the one hand the transfer points to transport means arranged ahead of and behind the stars, e.g. fixed-position stars, can be easily maintained, in particular if the capacity is provided to rotate about the axis-of-rotation of the adjacent fixed stars. The middle star is then preferably movable linearly perpendicular to the connection line between the axes-of-rotation of the two rotatable stars, such that the circumferential stretch on this middle movable star can be varied to an additionally extensive degree. The room for maneuver for the lengthening or shortening of the transport stretch is therefore considerably increased.

A change in the position of an axis-of-rotation of a star can be easily achieved if the axis-of-rotation of the movable star in the horizontal plane can likewise be rotated. A rotatable mounting is, on the one hand, mechanically stable, and, on the other, can be easily put into effect by a rotary drive. A capacity for linear movement of an axis-of-rotation of a star can be easily put into effect by means of a connecting link guide.

Preferably, therefore, the container-handling apparatus has at least one drive, controlled by a controller of the container-handling apparatus and/or the transporting apparatus, for the moving of the axes-of-rotation in the horizontal plane, this drive being designed in particular such as to maintain the transfer points between the stars at the movement of the stars. In this way, the lengthening/shortening of the transport stretch for the increasing/decreasing of buffer stretches can be easily put into effect in a controlled manner without interrupting the handling of the containers in the container-handling apparatus.

In an advantageous further embodiment of the invention, the axes-of-rotation of at least two stars arranged behind one another are movable, in particular rotatable. In this way, the accumulated circumferential stretch on these stars arranged behind one another can be changed very considerably, which substantially increases the capacity for the lengthening or shortening of the transport stretch. Preferably, an odd number of stars arranged behind one another are well-suited for this purpose, such as, for example, three, five, or seven. In this way, the movable stars can interact more easily with the other fixed components of the transporting apparatus or handling apparatus.

Accordingly, the transporting apparatus preferably has a group of three, in particular at least five, stars, of which at least two have movable axes-of-rotation. For example, it is also possible for a group of several stars to be moved in common by a drive, wherein the moved stars can even be connected, for example by a connecting brace. A lengthening or shortening of the transport stretch is then achieved, in that this entire group of connected stars is moved relative to a fixed-position star arranged in front and behind.

Preferably, the container-handling apparatus has a controller, which is designed such as to detect the container throughput at at least one point in the transport stretch, and, depending on the result, to adjust the position of the rotatably arranged axes-of-rotation. The controller is therefore in a position to compare the feed delivery speed to the processing speed of the container-handling machine, and, depending on the result of this comparison, to enlarge or reduce the transport stretch, i.e. the circumferential stretch over the totality of the stars. In this way it is possible to compensate for at least short-term capacity differences between the container delivery and the container-processing machine.

The invention also relates to a method for operating a container-handling apparatus such as has been described heretofore. According to the invention, the container throughput is detected at at least one point of the transport stretch on the basis of the signals from a detector and/or at least one signal output of the container-handling apparatus, and according to which the length of the transport stretch is then changed as a dependency of the signals from the detector/signal output, by the movement of the axes-of-rotation of at least two stars arranged behind one another and movable in the horizontal plane, and the corresponding change of the transfer points between the stars is altered. With regard to the effects and advantages of the invention, reference is made to the description of the container-handling apparatus according to the invention.

Preferably, the position of the axis-of-rotation of stars before and behind the moving stars is fixed. In this way, the transfer point between the fixed and moving stars can be easily adjusted, in particular if the axis-of-rotation of the moving stars can be rotated about the axis-of-rotation of the fixed arranged star.

Preferably, a group of at least three movably mounted stars is used, of which the axes-of-rotation of the two outer movably mounted stars can be rotated about the axis-of-rotation of the fixed adjacent stars, such that these can easily maintain the transfer point to the fixed stars. The middle movable star is then either movable linearly transverse to the connection line between the axes-of-rotation of the rotatably arranged stars or can be rotated in such a way that the direction of movement of the rotation movement on the connection line between the rotatably arranged stars runs perpendicular to them.

Preferably, the transfer points between stars following one another are maintained during a movement of the movably arranged stars. In this way the handling of the containers during an adjustment procedure of the movably arranged stars does not need to be interrupted.

The variable length for shortening or lengthening the transport stretch can be enlarged if a group of at least three, in particular at least five, stars are used following one another, of which at least two are movable.

The following expressions are used as synonyms: Movable—movably arranged; transport . . . —conveying . . . ; transport stretch—cumulative circumferential stretches over the stars arranged behind one another.

It is obvious to the person skilled in the art that the device and technical method aspects referred to above of the different embodiment variants of the invention can be combined with one another in any desired manner.

It is also obvious to the person skilled in the art that the container-handling apparatus is designed for all types of containers and performs. That is to say, for example, for disposable or reusable plastic containers, bottles, performs, and cans.

BRIEF DESCRIPTION OF THE FIGURES

The invention is described hereinafter by means of an exemplary embodiment. The Figures show:

FIG. 1 shows a view from above onto the container-handling apparatus with shortened transport stretch, FIG. 2 shows the apparatus of FIG. 1 with an extended transport stretch, FIG. 3 shows a sketch of the mathematical calculation of the transport stretches from the accumulation of the circumferential stretches of the containers on the individual stars, FIG. 4 shows a variable transport stretch on a group of five stars arranged behind one another, wherein the first and last stars are fixed.

DETAILED DESCRIPTION

Figure 5:
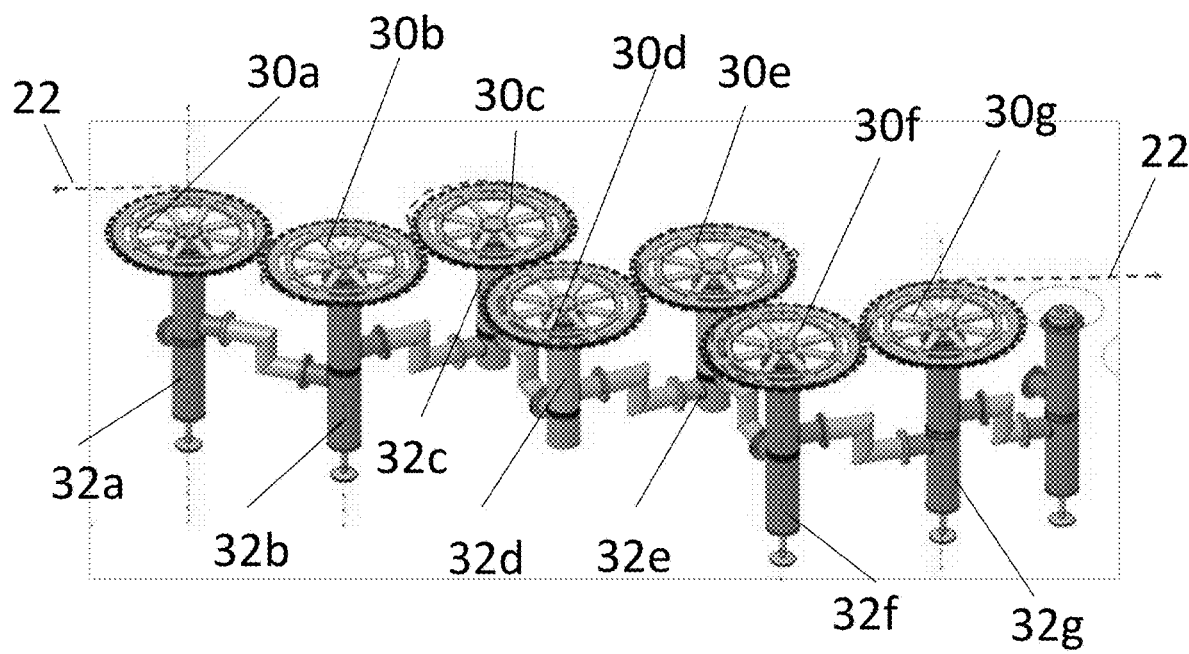
FIGS. 5 to 15 show positions of axes-of-rotation in a group of seven stars when reducing transport stretch to lower buffer capacity.
Figure 6:
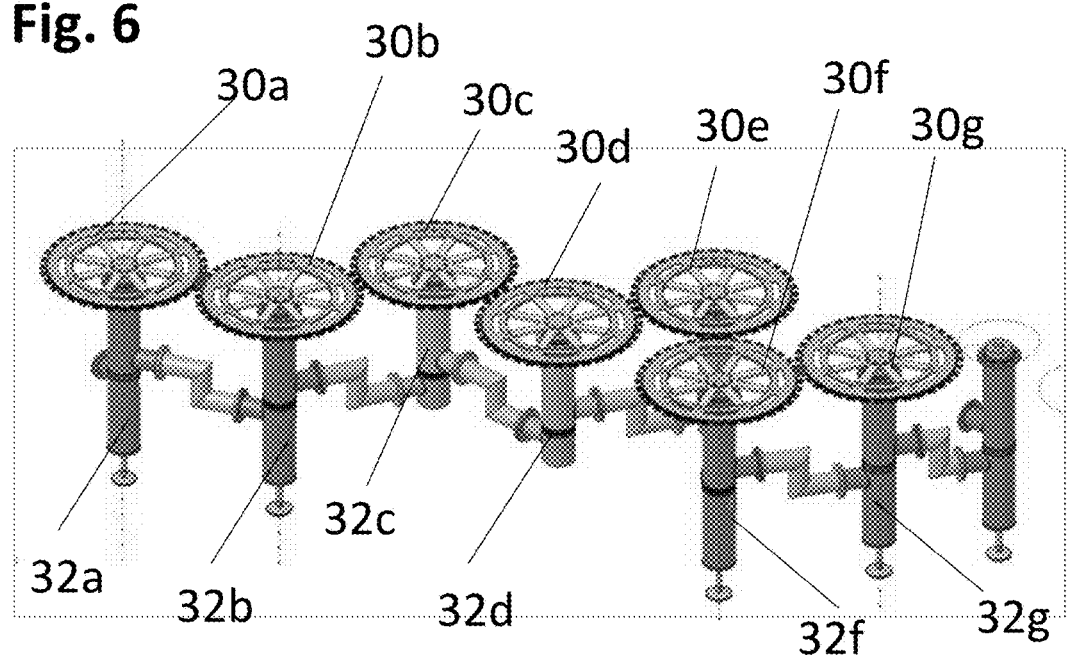
Figure 7:
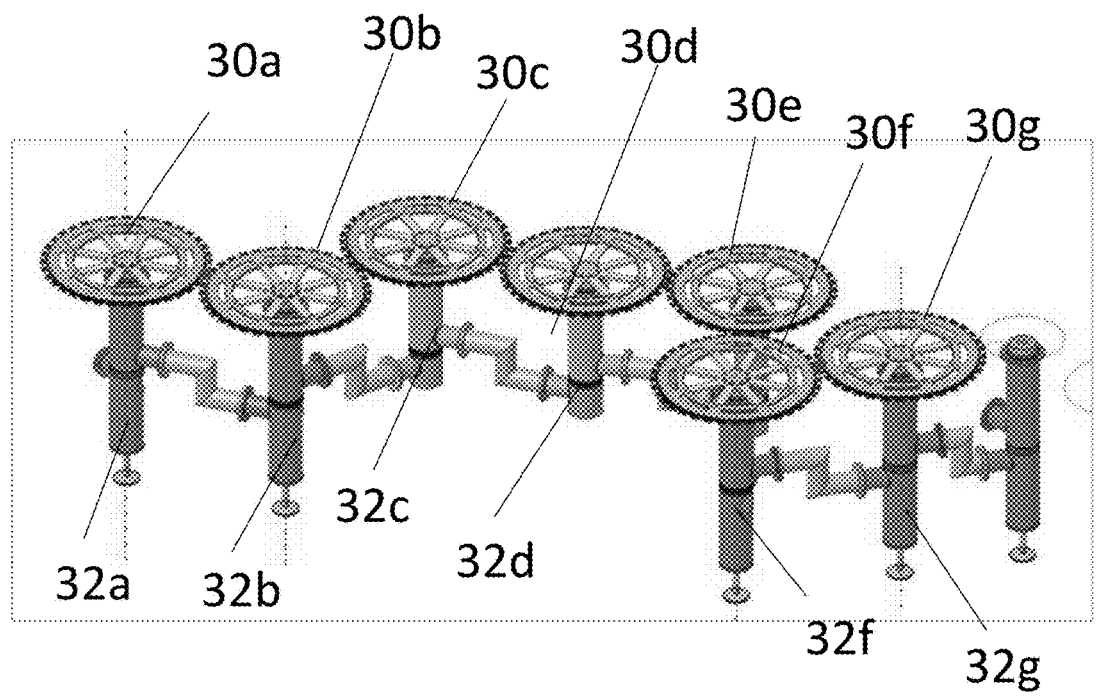
Figure 8:
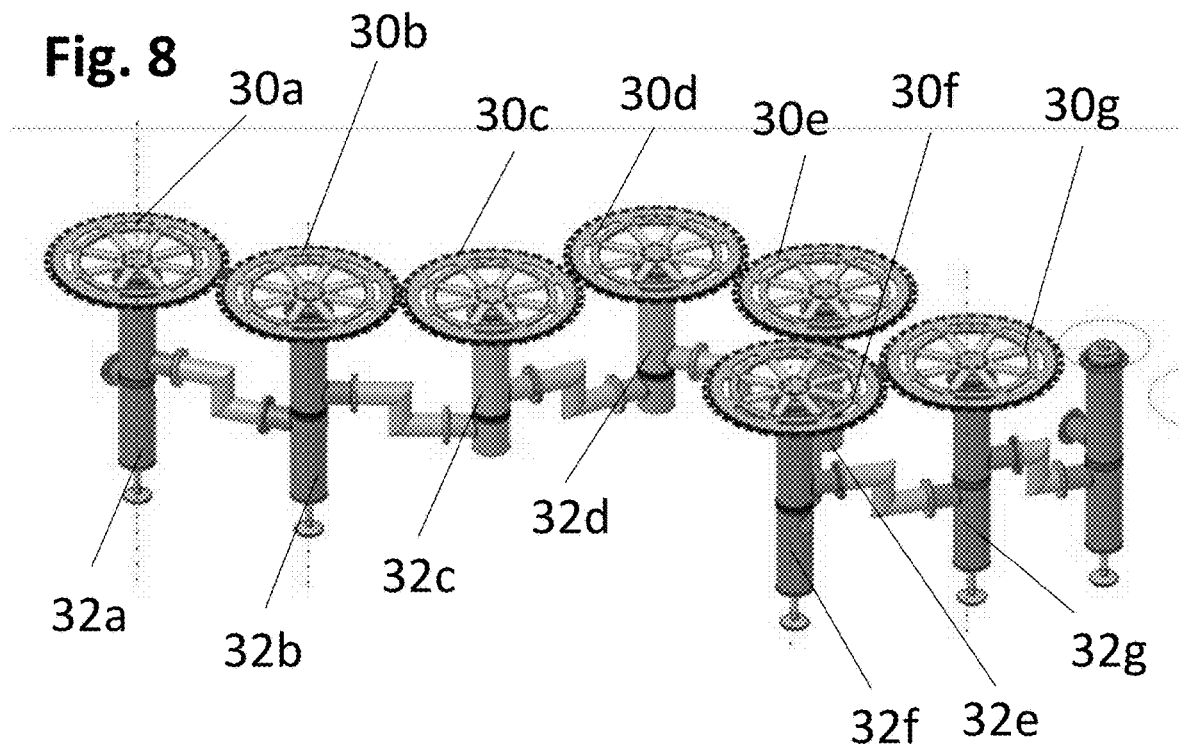
Figure 9:
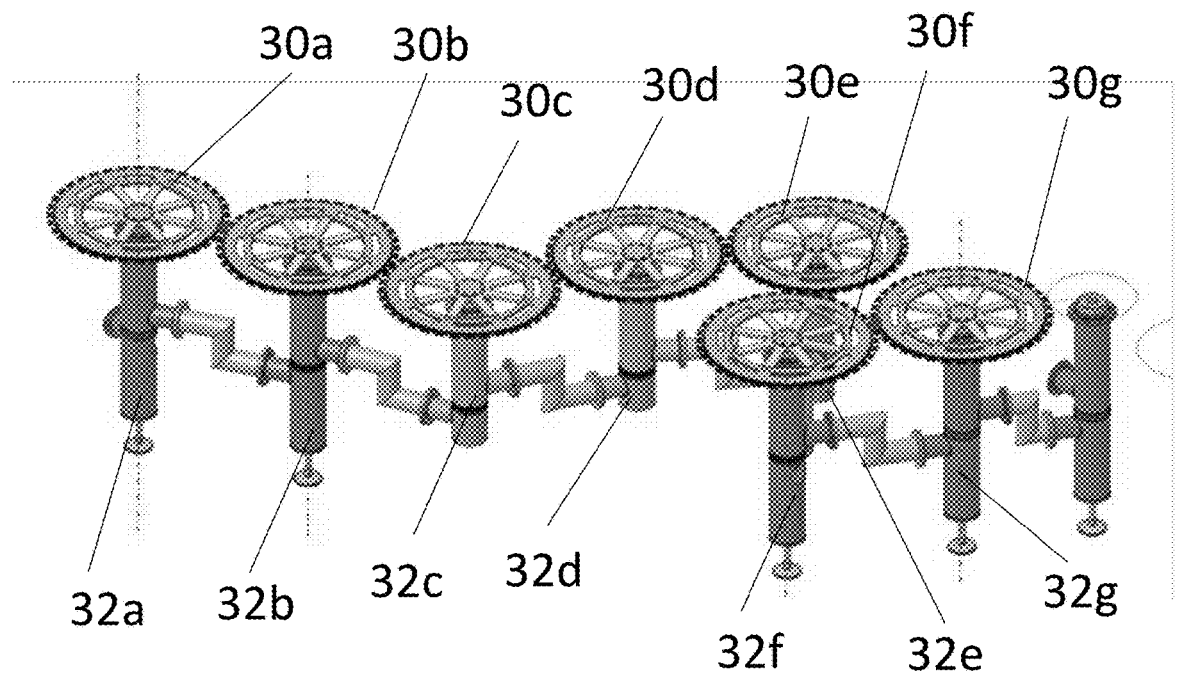
Figure 10:
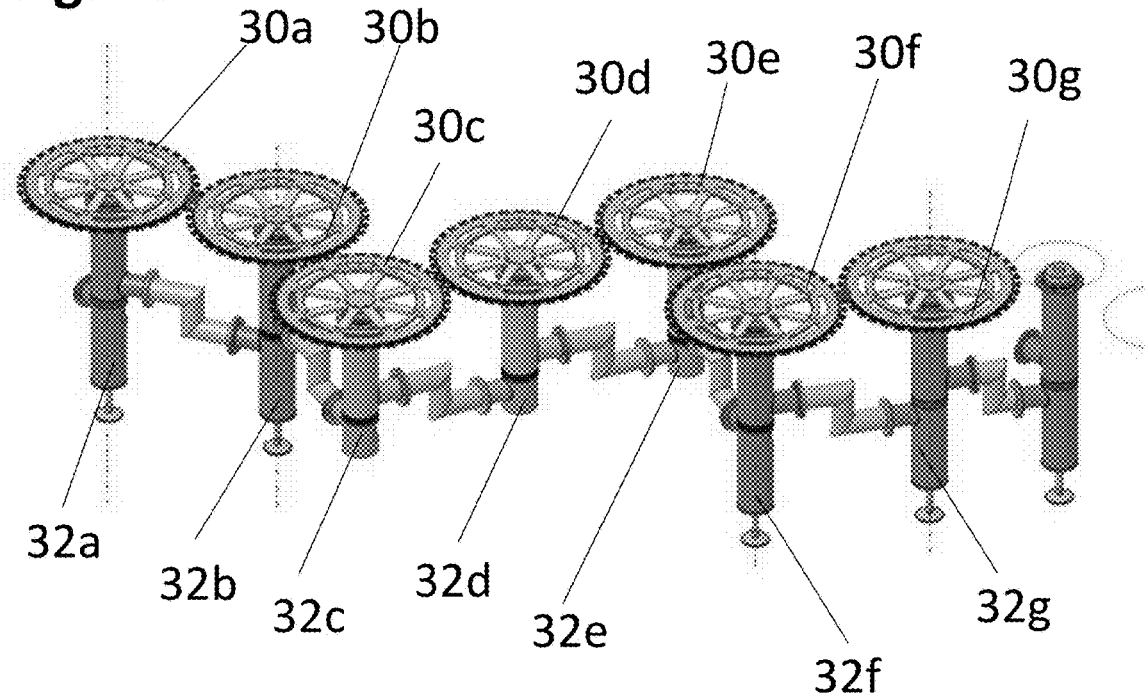
Figure 11:
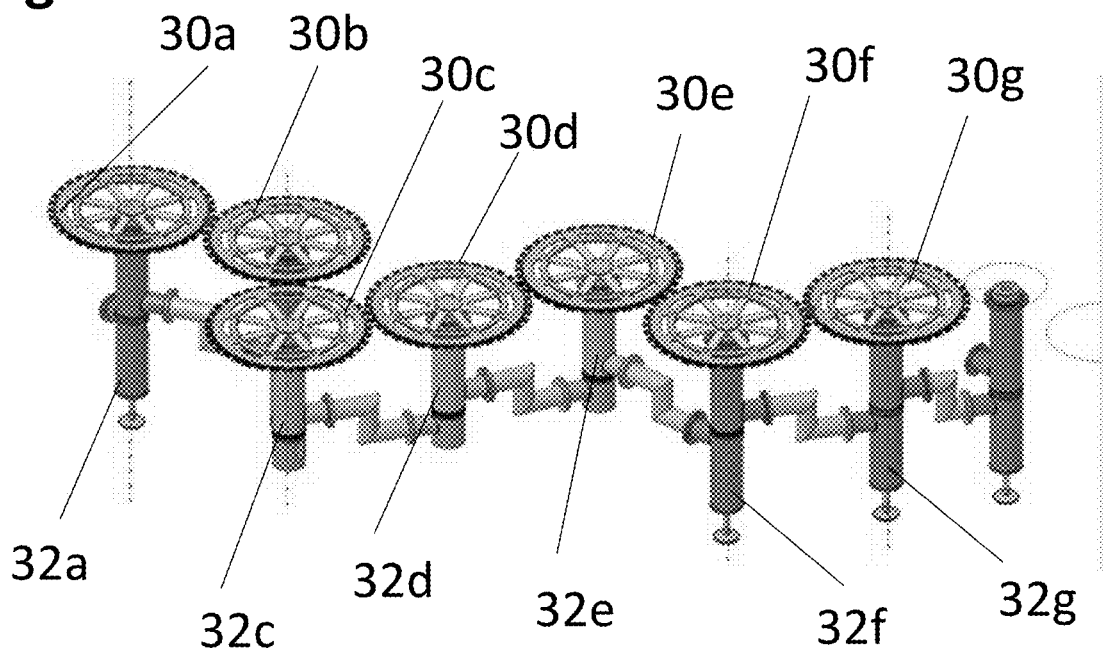
Figure 12:
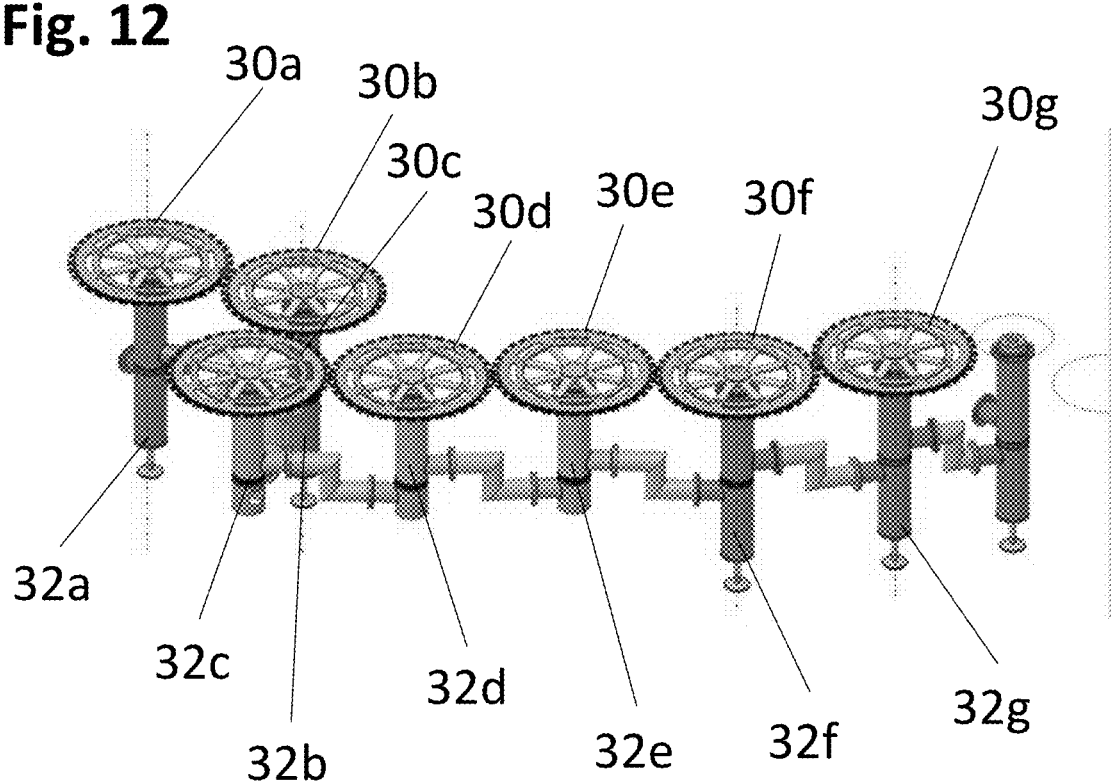

FIG. 1 shows a container-handling apparatus 10 having a container delivery feed 12 and a transporter 14 comprising star wheels, which will be referred to herein as "stars" 20a-20e. The stars 20a-20e transport containers 23 between the container delivery feed 12 and a container-handling machine 16. Each star 20a-20e rotates about its corresponding axis 15a-15e. Each star 20a-20e also has container holders evenly spread along its circumference.

The transfer from a first star 20a-20d to a second star 20b-20e that follows takes place at a transfer point 17a-17d that is common to both stars 20a-20e. While on a particular star 20a-20e, a container 23 traverses a "circumferential stretch." This circumferential stretch is given by the product of the star's radius and the angle traversed by the container, in radians. The total distance travelled by a container 23, referred to herein as the "transfer stretch 22," is formed by the accumulated circumferential stretches of the containers 23 on each of the stars 22a-22e between first and last transfer points 17a-17d.

A transporter 14 comprises fixed stars 20a, 20e and movable stars 20b-20d. The fixed stars 20a, 20e have fixed axes 15a, 15e. The movable stars 20b-20d have movable axes 15b-15d. These movable axes 15b-15d either move along a plane, either by moving linearly or along an arc of a circle. In FIG. 1, there are first and second fixed stars 20a, 20e and first, second, and third movable stars 20b-20d.

As a result of having movable stars 20b-20d, it is possible to control the locations of the transfer points 17a-17d. This makes it possible to control the circumferential stretch 22 of the containers 23 on the stars 20a-20e.

A controller 18 controls such movement. To provide the controller 18 with the information it needs, a data connection 13 connects the controller 18 to a detector 24. In some embodiments, the data connection 13 is wireless and in others it is wired.

As a result of the data connection 13, the controller 18 learns whether containers 23 are entering the transporter 14 at a rate that differs from the rate at which they are leaving the transporter 14. This can be achieved by measuring the delivery feed rate in the region of the feed 12 and using it to calculate the container throughput or by obtaining measurements of both the delivery feed rate and the rate at which containers exit the transporter 14.

Using the above information, the controller 18 moves the movable stars 20b-20d to lengthen or shorten the transfer stretch 22. This permits the creation of a buffer zone using the circumferential stretches of the containers 23 on the stars 20a-20e. It also permits the dynamic variation of that buffer zone as circumstances require. The ability to dynamically vary the buffer zone provides a way to compensate for short-term differences between the container delivery rate calculated by the detector 24 and the container throughput indicated by the container-handling machine 16.

Upon detecting the possibility of a container backup in the transporter 14, the controller 18 causes a drive 26 to enlarge the buffer zone by reconfiguring the transporter 14 from the state shown in FIG. 1 to the state shown in FIG. 2. In particular, the drive 26 moves the first and third movable stars 20b, 20d along a circular arc shown by the arrows in FIG. 1. This moves their corresponding axes 15b, 15d along arcs of two circles as they revolve part-way around the axes 15a, 15e of the corresponding first and second fixed stars 20a, 20d. Meanwhile, the drive 26 also moves the second movable star 20c linearly to maintain all transfer points 17b, 17c with the first and third movable stars 20b, 20d.

In the configuration shown in FIG. 2, the entire transport stretch 22, i.e. the accumulated circumferential stretch on all three fixed stars 20b, 20c, 20d, is substantially greater than that shown in FIG. 1. This has the effect of enlarging the transporter's buffer zone, thus permitting it to catch up with a short-term capacity bottleneck in the container-handling machine 16. Once the container-handling machine can again run at full capacity, the drive 26 reduces the buffer's size by reconfiguring the transporter 14 into the original state, which is shown in FIG. 1.

FIG. 3 shows a similar arrangement as in FIGS. 1 and 2, in which parts that are identical or have the same function are provided with identical reference numbers. The transporter 14 in this case has two fixed stars 20a, 20e and two movable stars 20b, 20c between the fixed stars 20a, 20e.

In this case, the containers 23 run from the container delivery feed 12 onto the first fixed star 20a. From there they traverse a first angle α1 to reach a first transfer point 17a onto the first movable star 20b. The containers 23 then traverse a second angle α2 to reach a second transfer point 17b, where they are transferred to the second movable star 20c. The containers then traverse a third angle α3 to reach a third transfer point 17d, where they are transferred onto the second fixed star 20e. The containers then traverse a fourth angle α4 as far as a removal point.

The first movable star 20b has its axis 15b mounted so as to be move along a circle with the radius ra as it revolves around the first fixed-star's axis 15a. In this way, the first movable star 20b maintains the first transfer point 17a. The same activity arises with the second movable star 20c and the second fixed star 20e. As a result, there is no interruption in container handling while the buffer is being dynamically changed. A suitable drive 26 is implemented by having two rotation arms linked to the axes 15b, 15c of the movable stars 20b, 20c.

FIG. 4 in turn shows a transporter 14 that is similar to that shown in FIG. 1 but with the second movable star 20c being much larger than the first and third movable stars 20b, 20d. The second movable star 20c is moved linearly along a direction perpendicular to a line that connects the axes 15a, 15e of the fixed stars 20a, 20e. The axes of the movable stars 20b, 20d revolve around the fixed axes 15a, 15e as shown in FIG. 3.

It is advantageous, but not essential, for the transfer points 17a-17d to be maintained during the movement of the stars 20b-20d. In principle it would also be possible for contact between the stars 20b-20d to be released during reconfiguration of the transporter 14. The stars 20a-20d would then be brought back into contact to reform the transfer points 17a-17d after configuration has been completed. However, this would mean that reconfiguration could not be carried out while containers 23 are being handled.

FIGS. 5 to 15 show, by analogy with FIGS. 1 to 4, a transporter 14 with seven stars 30a-30g, each of which rotates about a corresponding axis 32a-32g. Of these seven stars 30a-30g, there are three movable stars 30c, 30d, 30e with corresponding three movable axes 32c, 32d, 32e. The configuration sequence shown in FIGS. 5 to 13 shows the three movable stars 30c, 30d, 30e moving in a way that shortens the transport stretch 22, which reaches its minimum length in FIG. 15.

In FIG. 5, the seven stars 30a-30g are arranged so that the circumferential stretch on each star 30a-30g is quite long. As a result, the transport stretch 22 is also long. The three movable stars 30c, 30d, 30e are held on axes that revolve around the fixed axes 32b, 32f of adjacent stars 30b, 30f.

Figure 13:
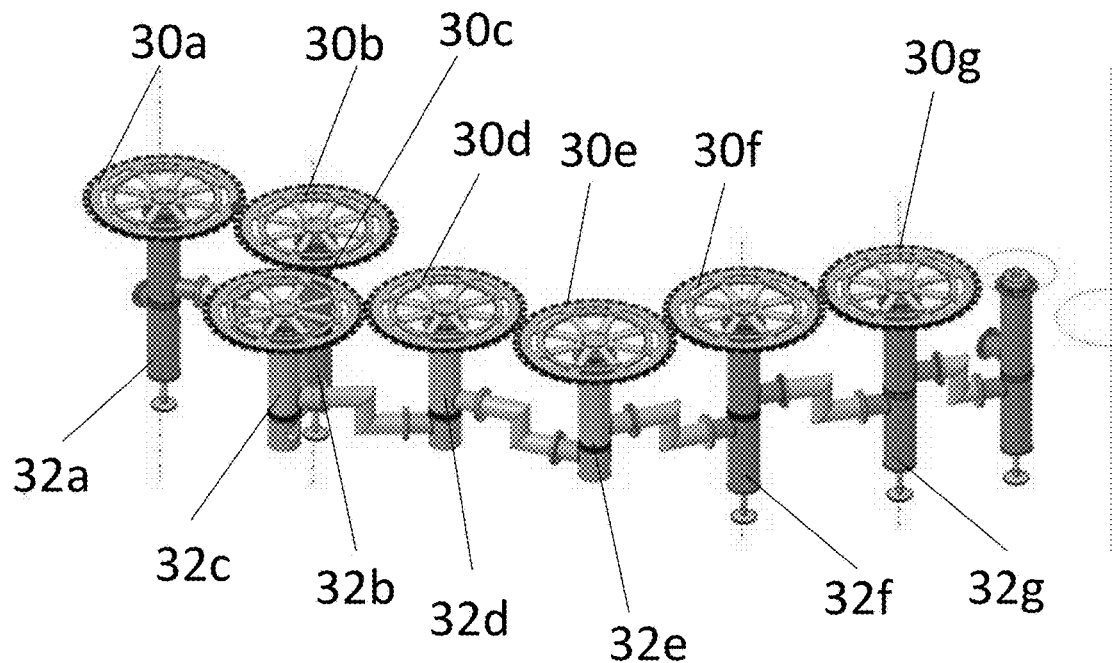
Figure 14:
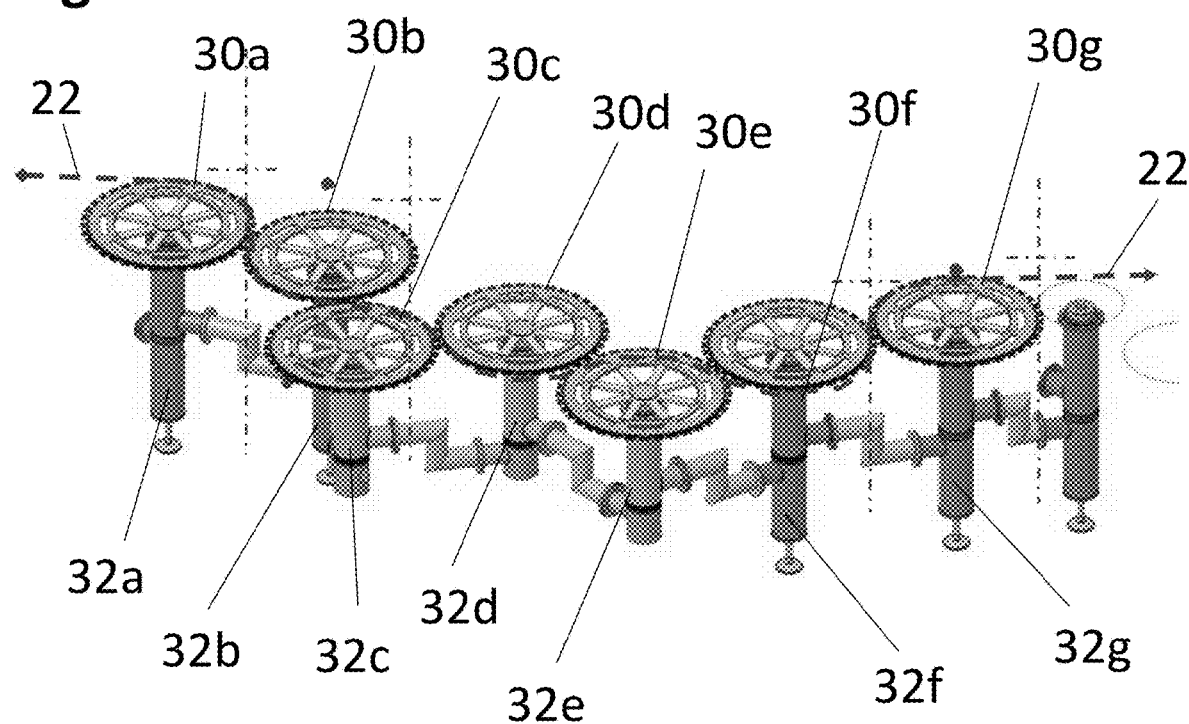
Figure 15:
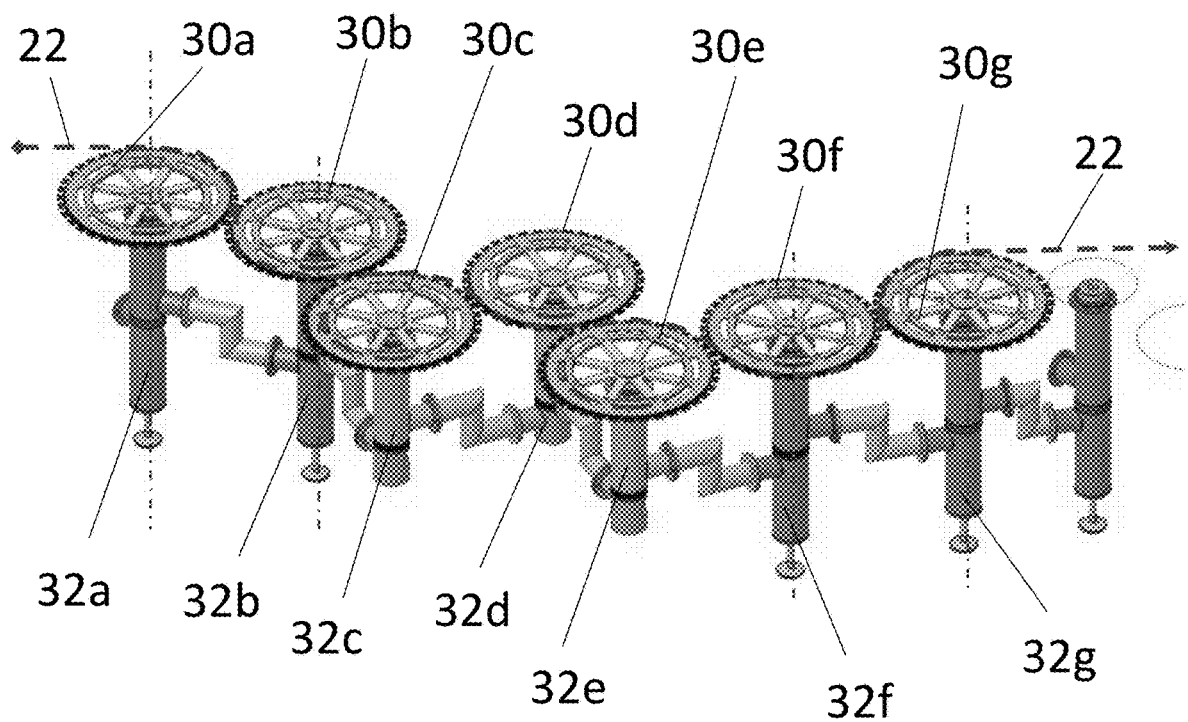

As can be seen at the end of the movement path in FIG. 13, the transport stretch 22 in the end position, after the adjustment of the three movable stars 30c, 30d, 30e, is substantially shorter over the entire group of the seven stars 30a-30g than at the beginning in FIG. 5. In this way, therefore, a quantity on the buffer stretch is reduced, for example, if, in the context of a short period of asynchronous operation during which the handling capacity of the container-handling machine 16 is greater than the delivery feed rate from the container deliver feed device 12. To increase the buffer's size, the configuration is run in reverse from FIG. 15 to FIG. 5.

In some embodiments, the movable axes 32c, 32d, 32e, instead of being mechanically linked, are moved by a linear drive.

In other embodiments, one or more fixed tracks or guide carves positively guide the motion of the movable stars 20b-20d. Other embodiments include those in which additional or alternative drive means are provided, which are not fixed in or at one of the stars, by means of which the rotational and/or travel movement of these movable stars 20b-20d is achieved.

The invention claimed is:

1. An apparatus for handling containers selected from the group consisting of bottles and preforms, said apparatus comprising a container-handling machine and a transporter upstream of said container-handling machine, said container-handling machine being selected from the group consisting of a blow-molding machine, a labeling machine, a cleaning machine, a filling machine, and a packing machine, said transporter comprising stars arranged in series, each of said stars having container holders along a circumference thereof for gripping said containers, wherein said stars are arranged such that a container is transferred at a transfer point that is common to two successive stars, wherein each of said stars rotates about an axis, wherein said stars comprise fixed stars and movable stars, wherein said movable stars rotate about movable axes and said fixed stars rotate about fixed axes, and wherein said movable axes are movable in a controlled manner relative to said fixed axes.

2. The apparatus of claim 1, wherein at least one of said movable axes revolves around a fixed axis.

3. The apparatus of claim 1, wherein at least one of said movable axes revolves around a point in a horizontal plane.

4. The apparatus of claim 1, wherein at least one of said movable axes moves linearly along a horizontal plane.

5. The apparatus of claim 1, further comprising a controller that controls movement of said movable axes so as to maintain said transfer points between adjacent stars during such movement, thereby permitting container transfer to be unimpeded by said movement.

6. The apparatus of claim 1, further comprising a controller that receives information indicative of container throughput and causes movement of said movable axes in response to said information.

7. The apparatus of claim 1, wherein said movable stars comprise first, second, and third stars, said second star being between said first and third stars, wherein axes of said first and third stars move by revolving around corresponding points and an axis of said second star moves linearly.

8. An apparatus for handling containers, said apparatus comprising a transporter upstream of a container-handling machine, said transporter comprising stars arranged in series, each of said stars having container holders along a circumference thereof for gripping containers, wherein said stars are arranged such that a container is transferred at a transfer point that is common to two successive stars, wherein each of said stars rotates about an axis, wherein said stars comprise fixed stars and movable stars, wherein said movable stars rotate about movable axes and said fixed stars rotate about fixed axes, wherein said movable axes are movable in a controlled manner relative to said fixed axes, and wherein said movable stars comprise first, second, and third stars, said second star being between said first and third stars, wherein axes of said first and third stars move by revolving around corresponding points and an axis of said second star moves linearly.

9. A method comprising compensating for a mismatch between container input and container output in a transporter that is upstream of a container-handling machine selected from the group consisting of a blow-molding machine, a labeling machine, a cleaning machine, a filling machine, and a packing machine, said transporter comprising stars arranged in series, each of said stars having container holders along a circumference thereof for gripping containers at necks thereof, wherein said stars are arranged such that a container selected from the group consisting of bottles or preforms is transferred at a transfer point that is common to two successive stars, wherein each of said stars rotates about an axis, wherein said stars comprise fixed stars and movable stars, wherein said movable stars rotate about movable axes and said fixed stars rotate about fixed axes, and wherein said movable axes are movable in a controlled manner relative to said fixed axes, wherein compensating for said mismatch comprises receiving information indicative of container throughput along said transport stretch and, in response to said information, changing a length of said transport stretch, wherein changing said length comprises causing said movable stars to move relative to said fixed stars.

10. The method of claim 9, wherein said movable stars are between said fixed stars.

11. The method of claim 9, wherein causing said movable stars to move comprises causing three movable stars to move, wherein causing said three movable stars to move comprises causing a first movable star to move along a circular arc centered at an axis of a first fixed star and causing a second movable star to move along a circular arc centered at an axis of a second fixed star.

12. The method of claim 9, wherein causing said movable stars to move comprises causing said movable stars to move in a manner that maintains transfer points between said movable stars and said fixed stars.

* * * * *